(No Model.)
B. J. HALL & J. E. MUSTARD.
CULTIVATOR.
No. 284,734. Patented Sept. 11, 1883.
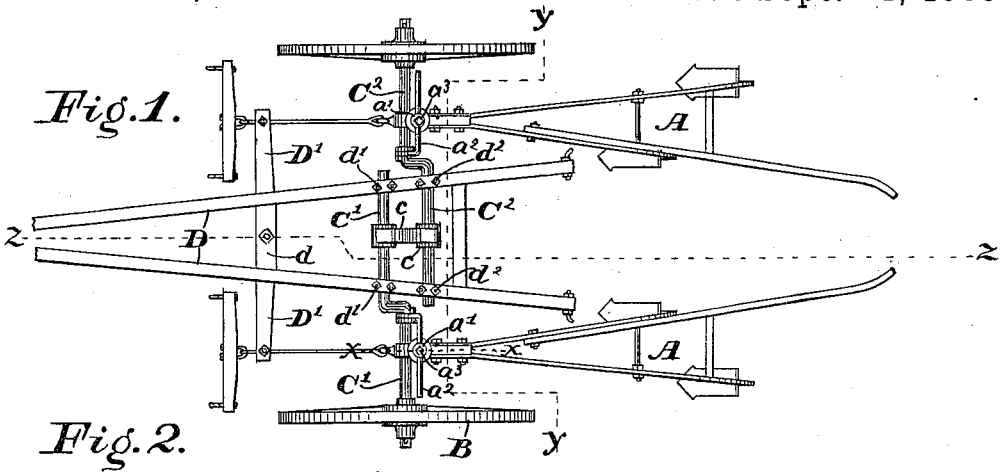
Fig. 1.
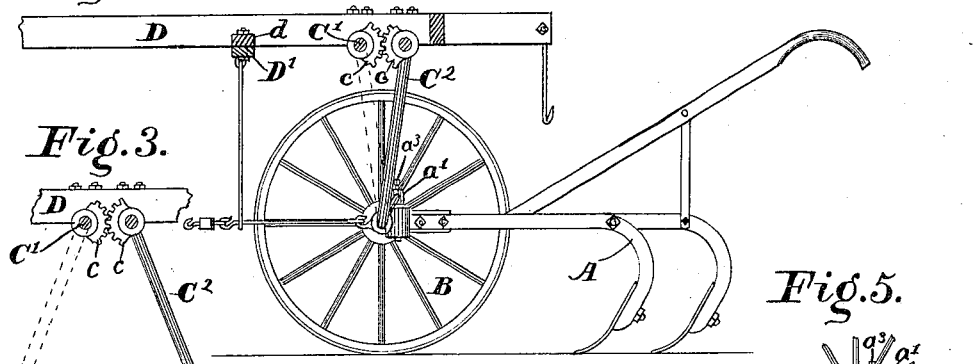
Fig. 2.
Fig. 3.
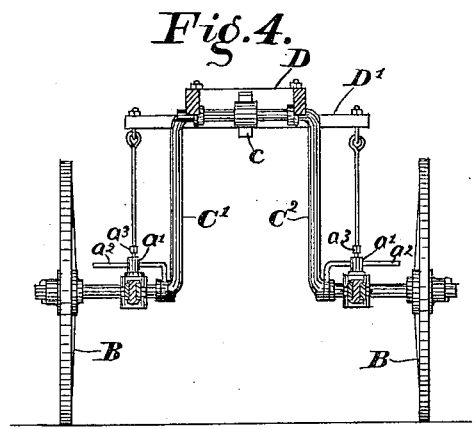
Fig. 4.
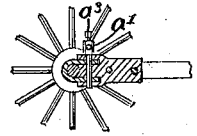
Fig. 5.
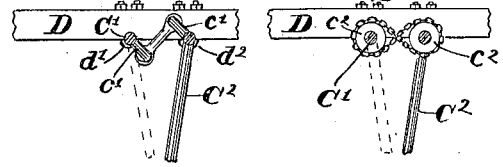
Fig. 6. Fig. 7.
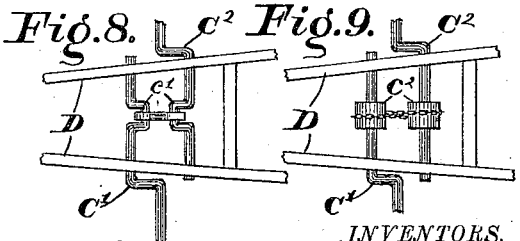
Fig. 8. Fig. 9.
WITNESSES.
Chas. N. Leonard
E. W. Bradford
INVENTORS.
Benjamin J. Hall,
and James E. Mustard,
PER
C. Bradford,
ATTORNEY.
N. PETERS, Photo-Lithographer, Washington, D. C.

UNITED STATES PATENT OFFICE.

BENJAMIN J. HALL AND JAMES E. MUSTARD, OF GLEN HALL, INDIANA.

CULTIVATOR.

SPECIFICATION forming part of Letters Patent No. 284,734, dated September 11, 1883.

Application filed February 2, 1883. (No model.)

*To all whom it may concern:*

Be it known that we, BENJAMIN J. HALL and JAMES E. MUSTARD, of Glen Hall, in the county of Tippecanoe and State of Indiana, have invented certain new and useful Improvements in Cultivators, of which the following is a specification.

The principal object of our said invention is to produce a cultivator in which the gangs of plows are adapted to be drawn independently of each other, and are permitted to move back and forth as the animals drawing them move ahead or drop behind one another, while at the same time they are connected together through the axle. This object is accomplished by making the axle in two pieces, each of which is independently mounted in bearings on the tongue, and are connected together by a gear, connecting-rod, belt, or some similar device, whereby when the lower horizontal portion of one axle is advanced the other will be caused to recede in its relation to the tongue a corresponding distance, as will be hereinafter more particularly described.

The invention further relates to the manner of adjusting the plows on the axles.

Referring to the accompanying drawings, which are made a part hereof, and on which similar letters of reference indicate similar parts, Figure 1 is a top or plan view of a cultivator embodying our invention; Fig. 2, a longitudinal sectional view thereof, looking upwardly from the dotted line $z\ z$ in Fig. 1; Fig. 3, a view similar to a portion of Fig. 2, showing the axle in the position it assumes when the animals drawing the plows advance unequally; Fig. 4, a vertical sectional view, looking to the left from the dotted line $y\ y$ in Fig. 1; Fig. 5, a detail sectional view on the dotted line $x\ x$ in Fig. 1; Figs. 6 and 7, views similar to a portion of Fig. 2, of alternate constructions; and Figs. 8 and 9, top or plan views of the devices shown in Figs. 6 and 7.

In said drawings, the portions marked A represent the gangs of plows; B, the wheels; C′ C², the two parts of the axle, and D the tongue or pole of the cultivator.

The plows A are not in themselves dissimilar to ordinary plows in similar implements. They are connected by suitable clevises, $a$, to the axles, said clevises being secured to the plow-beams by pins $a'$. Said pins have holes in their upper ends, through which small rods $a^2$ pass, and are secured to said rods at any point that may be desired by means of set-screws $a^3$. The rods $a^2$ have vertical portions, which are journaled on the axle C′ C², whereby they are enabled to swing sufficiently to allow the plows to be elevated or depressed, as desired. This forms a desirable means of adjusting the plows on the axles toward or from each other.

The wheels B and tongue D are or may be of any suitable construction, and need no special description.

The axle is composed of the two parts C′ C², each of which is mounted in bearings on the tongue D, (said bearings being preferably formed of or secured to said frame-work by clips $d'\ d^2$,) or an equivalent frame-work, and extends down and out to receive the plows and wheels in the ordinary manner. The upper horizontal portions, which are mounted in said bearings, are each provided with a gear wheel or segment, $c$, a crank, $c'$, a pulley, $c^2$, or some equivalent device, and are connected by the teeth of the gear-wheels, a connecting-rod attached to the cranks, a belt upon the pulleys, or in some other suitable manner, so that they shall rotate, when they rotate at all, in different directions, and thus cause one to recede in its relation to the tongue as the other advances, and thus permitting one of the wheels to be some distance behind the other while keeping both wheels in parallel relation at all times. This permits the animal drawing one plow to drop back behind the animal drawing the other without changing the course of either of the plows or varying the distance between furrows made thereby. The two portions of the axle being connected together as described gives a further advantage—i. e., that, while the ordinary double-tree is entirely absent in this construction, and therefore the passage under the arch is unobstructed, the two single-trees are connected together in a manner which virtually gives all the desirable results of such a double-tree.

The tongue D may be of any approved form. It has a cross-bar, $d$, from which a pivoted bar, D', depends, to which is suspended the draft-rods to which the single-trees are attached, as shown in Figs. 1 and 2.

Having thus fully described our said invention, what we claim as new, and desire to secure by Letters Patent, is—

1. The combination, in a cultivator, of a two-part axle, the parts being journaled in separate bearings on the tongue or frame parallel to each other and connected together by devices, substantially as described, whereby they are permitted to vary in their relative positions in the line of advancement without changing the course of the plows or varying the distance between them laterally, substantially as set forth.

2. The combination of the plows, the wheels, the two-part axle $C'$ $C^2$, devices, substantially as described, for connecting said axle parts, the tongue, and means of attaching the animals to the plows, forming a cultivator, substantially as set forth.

3. In a cultivator, the two-part axle $C'$ $C^2$, each part being journaled on the tongue or frame parallel to the other, and provided with a cog-gear, $c$, which engages with a similar gear on the other, substantially as described, and for the purposes specified.

4. The combination, with the plows and axle of a cultivator, of the rod $a^2$, pin $a'$, and set-screw $a^3$ as a means of securing the plows in position upon the axle, substantially as specified.

In witness whereof we have hereunto set our hands and seals, at Glen Hall, Indiana, this 23d day of January, A. D. 1883.

BENJAMIN J. HALL. [L. S.]
JAMES E. MUSTARD. [L. S.]

In presence of—
JAMES L. PENDROY,
JOHN LAYDEN.